F. A. STEVENS.

OPHTHALMIC MOUNTING.

APPLICATION FILED DEC. 8, 1921.

Reissued July 25, 1922. 15,425.

Inventor;
Frederick A. Stevens.
by David Rines
Attorney;

UNITED STATES PATENT OFFICE.

FREDERICK A. STEVENS, OF PROVIDENCE, RHODE ISLAND, ASSIGNOR TO STEVENS AND COMPANY, INCORPORATED, OF PROVIDENCE, RHODE ISLAND, A CORPORATION OF RHODE ISLAND.

OPHTHALMIC MOUNTING.

15,425. Specification of Reissued Letters Patent. Reissued July 25, 1922.

Original No. 1,383,872, dated July 5, 1921, Serial No. 328,102, filed October 3, 1919. Application for reissue filed December 8, 1921. Serial No. 520,985.

*To all whom it may concern:*

Be it known that I, FREDERICK ARTHUR STEVENS, a citizen of the United States, residing at Providence, in the county of Providence and State of Rhode Island, have invented a new and useful Improvement in Ophthalmic Mountings, of which the following is a specification.

My invention relates to devices for lockings lenses and the like against rotation in their frames or mountings, such as the rims of spectacles and eyeglasses.

The objects of my invention are more particularly to improve the construction of spectacles, eye glasses and the like, whereby the lenses are locked against rotation in the rims, and looseness of the lenses in the rims is eliminated.

With these objects in view, a feature of my invention contemplates the provision, in the lens-receiving groove of the lens rim, of a notch that extends but part way through the thickness of the rim. The lens is also provided with a registering notch situated opposite to the notch in the rim. A separable element is removably mounted in the oppositely disposed notches to lock the lens against rotation in the groove. This locking element is preferably compressible, but is not necessarily so, and is conveniently and inexpensively of spherical or ball shape.

More specifically, a feature of my invention resides in the peculiar and novel construction of spectacles, eye-glasses and similar forms of ophthalmic mountings, in which the lenses are locked in the rims by a compressible locking member located in notches in the rims and lenses, whereby the lenses are locked in the rims by compressing the compressible locking member into the notches in the rims and lenses, in fastening the lenses in the rims.

Figure 1:
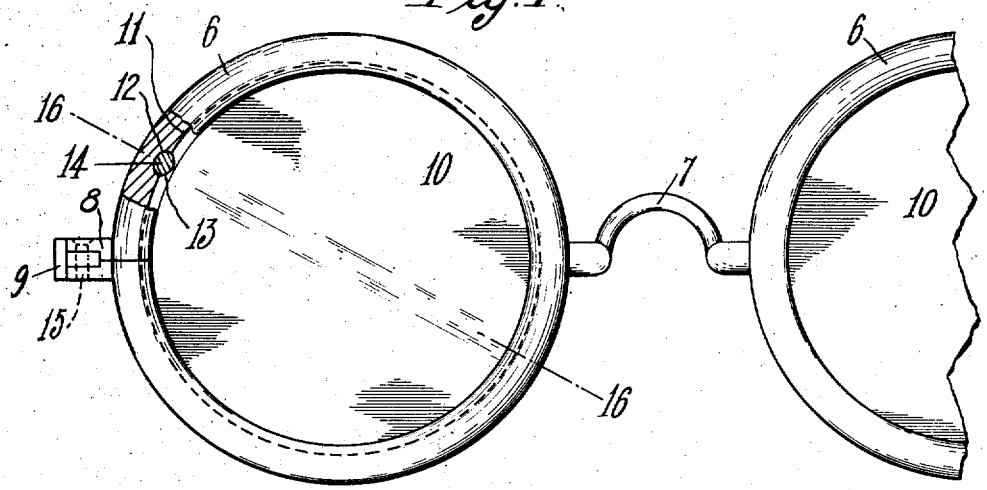
Figure 2:
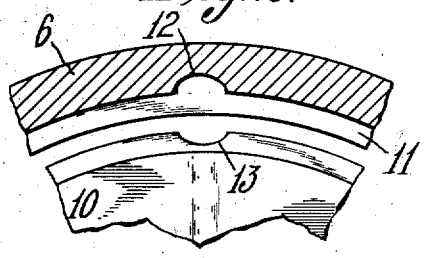
Figure 3:
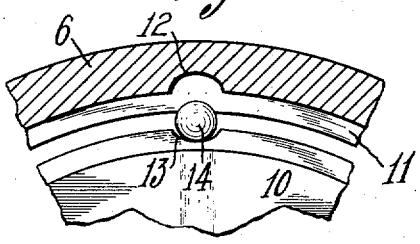
Figure 4:
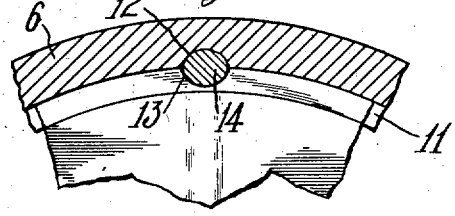
Figure 5:
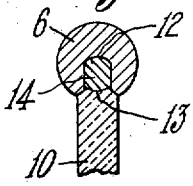

In the drawings, illustrating one embodiment of the present invention, Figure 1 is an enlarged face view of the greater portion of a spectacle frame provided with my improved means for locking the lenses in the rims;

Figs. 2, 3 and 4 are still further enlarged detail sectional views, Fig. 2 showing the rim separated from the lens, Fig. 3 showing the compressible locking member in place and Fig. 4 showing the lens locked to the rim; and Fig. 5 is an enlarged detail transverse sectional view through the rim and lens in the locked position.

In the drawings, 6 indicates a spectacle rim, connected to the usual bridge 7 and split end pieces 8, to which the usual temple 9 is pivotally secured, and 10 indicates the lens.

The rim 6 has the lens groove 11 in which is a small socket or notch 12, which may be semi-oval or of any other desired shape, and extending but part way through the thickness of the rim, as shown. The lens 10 has a similar notch 13 in its periphery corresponding to the notch 12 in the rim, and is formed in the periphery of the lens opposite to the notch in the rim.

A separable or removable locking member 14, preferably spherical in shape, is constituted preferably of lead or other suitable compressible material. The locking member 14 is of a size which, when compressed, will practically fill the space formed by the notches 12 and 13, when the rim is closed onto the lens, in securing the lens in the rim, by tightening the screw 15, in the split end pieces 8 in the usual way. The locking member 14 extends outwardly from the notch 12 in the rim 6 into the notch 13 in the lens 10. The notches 12 and 13 and the locking member 14 constitute the lens-locking means.

In the use of spectacles and the like having circular rims and in which circular lenses are held in the rims by friction only, the lenses have a tendency to turn in the rims, from wiping or cleansing the lenses and from other causes.

This is extremely detrimental, particularly so in cylindrical lenses, employed to correct astigmatism, as a slight turning movement of the lens in the frame will cause angular shifting of the cylindrical axis of the lens. This cylindrical axis is assumed to be parallel to the line 16, Fig. 1. Such shifting will destroy the astigmatic correction and will ruin the utility of the glasses until the fault is corrected.

In the use of my preferred improvement in ophthalmic mountings, a lens is locked in the rim, preferably by compressing a compressible locking member into registering notches in the lens and rim, in securing the lens in the rim, in the usual way, and looseness of the lenses in the rims is thereby eliminated.

It is evident that the point of locking may be located anywhere along the periphery of the rim, and a compressible locking member is preferable to accomplish this result.

Having thus described my invention, I claim as new:—

1. An ophthalmic mounting comprising a circular rim, a circular lens in the rim and ground on its surface to correct visual defects of the eye, and compressible means, intermediate the rim and the lens, for locking the lens within the rim.

2. An ophthalmic mounting comprising a circular rim having a lens groove and a notch in the lens groove, a circular lens in the lens groove and ground on its surface to correct visual defects of the eye, and having a notch in its edge in oppositely disposed relation to the notch in the rim, and a compressible locking member intermediate the notches in the rim and the lens, whereby, in securing the lens in the rim, the locking member is compressed into the notches in the rim and the lens thereby locking the lens within the rim.

3. In combination, a lens rim having a lens-receiving groove provided with a notch that extends but part way through the thickness of the rim, a lens in the groove provided with a notch registering with the groove notch, and a locking member freely separable from the rim removably mounted in both registering notches and engaging the walls of both notches to lock the lens against rotation in the groove.

4. An ophthalmic mounting comprising a lens rim having a lens-receiving groove provided with a notch that extends but part way through the thickness of the rim and that is adapted to removably receive a locking member that is freely separable from the rim, the locking member being adapted to lie also in a registering notch of a lens that is adapted to be received in the groove, and the locking member being adapted to engage the walls of both notches to lock the lens against rotation in the groove.

5. An ophthalmic mounting comprising a lens rim having a lens-receiving groove provided with a notch that extends but part way through the thickness of the rim and that is adapted to receive a ball adapted to engage a lens, thereby to lock the lens against rotation in the groove.

6. In an ophthalmic mounting, lens rims provided with sockets, and balls resting in the sockets extending outwardly from the rims for engagement with lenses.

7. In an ophthalmic mounting, circular lens rims having internal peripheral grooves and provided with sockets within the grooves, and balls resting in the sockets adapted to engage notches in the lenses.

In testimony whereof, I have hereunto subscribed my name this 21st day of November, 1921.

FREDERICK A. STEVENS.